United States Patent [19]

Bondioli

[11] 4,435,166
[45] Mar. 6, 1984

[54] GUARD MADE UP OF SECTIONAL UNITS FOR CARDAN SHAFTS

[76] Inventor: Edi Bondioli, Via Gina Bianchi 18, Suzzara, Mantova, Italy

[21] Appl. No.: 381,747

[22] Filed: May 25, 1982

[30] Foreign Application Priority Data

Jun. 5, 1981 [IT] Italy ............................. 9437 A/81

[51] Int. Cl.³ .............................................. F16D 3/84
[52] U.S. Cl. ..................................... 464/172; 464/901
[58] Field of Search ............... 464/162, 170, 172, 173, 464/901

[56] References Cited

U.S. PATENT DOCUMENTS 3,344,618 10/1967 Young ................................ 464/162
3,418,828 12/1968 Carns .............................. 464/172 X
3,498,082 3/1970 Geisthoff et al. ................... 464/172
3,504,508 4/1970 Bornzin ............................ 464/172 X

FOREIGN PATENT DOCUMENTS 2402726 9/1974 Fed. Rep. of Germany ...... 464/173
2045392 10/1980 United Kingdom ............... 464/172

Primary Examiner—Stuart S. Levy
Assistant Examiner—Daniel P. Stodola
Attorney, Agent, or Firm—McGlew and Tuttle

[57] ABSTRACT

A guard for telescopic cardan shafts, especially for agricultural machinery, comprises an open ring nut supported by an annular throat of a collar near a universal joint of the cardan shaft. Each annular sheath of a telescopic part of the guard engages into a seat formed by projections of the nut. Some of the projections have click detents which go into slots of the sheath releasing it. On the ring nut an inner funnel is mounted, inside the plane seats of which, resilient tongues of the ring nut release themselves performing a clamping function for the ring nut. An additional band springs into engagement on an annular zone of the inner funnel thus extending the latter. The additional band can move at an angle to the inner funnel from a position where holes of the band are lined up with holes of the funnel for access, to another position where the holes are offset to prevent access.

9 Claims, 16 Drawing Figures

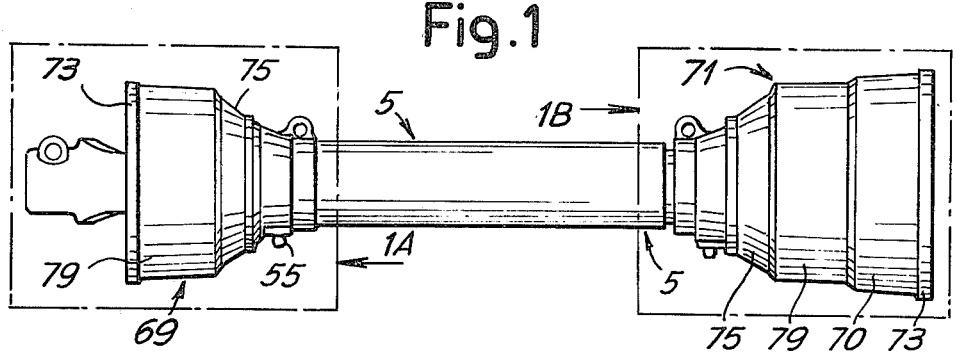
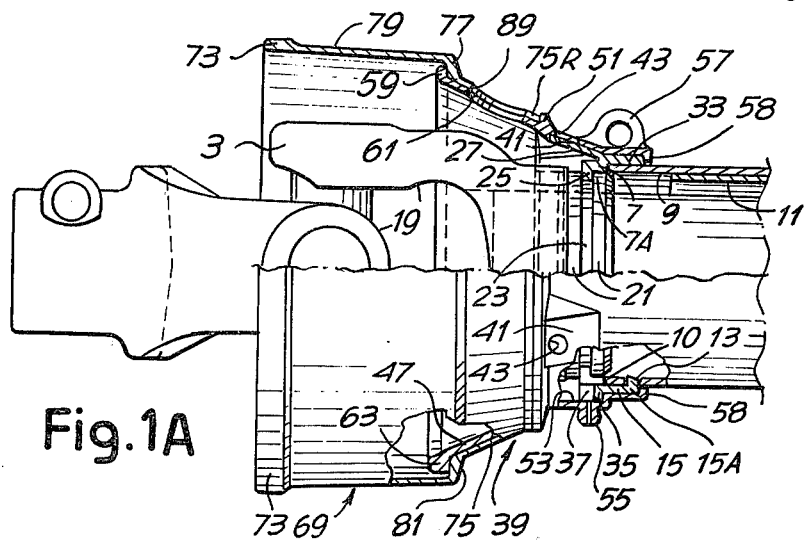
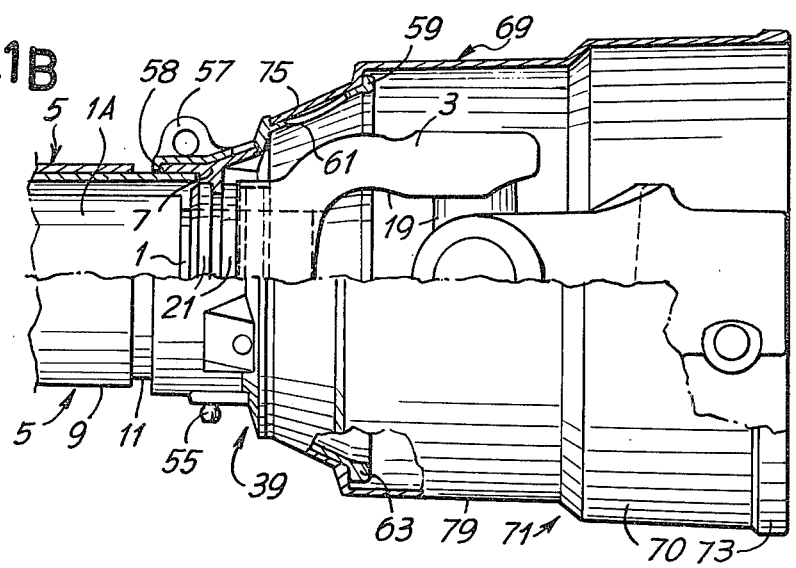

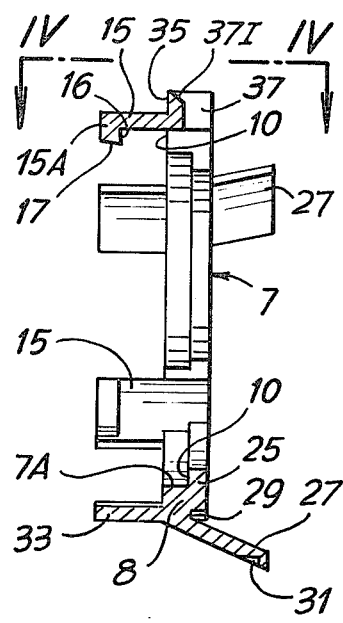
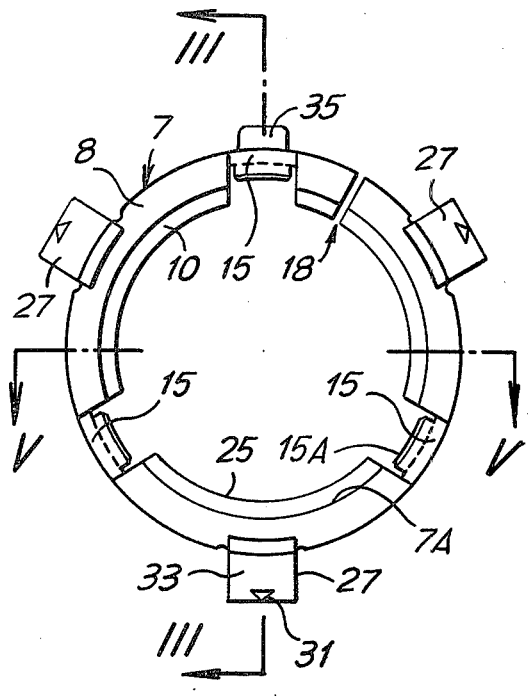
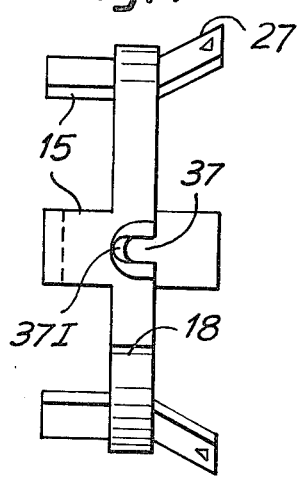
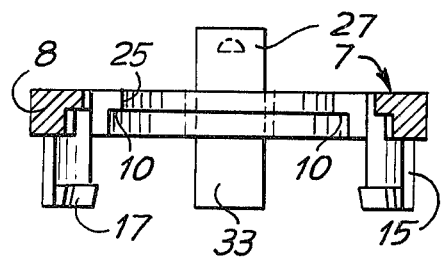

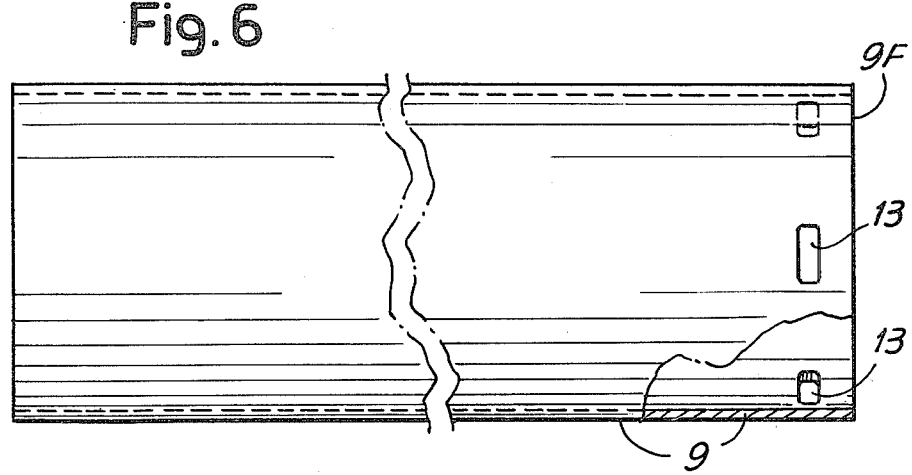
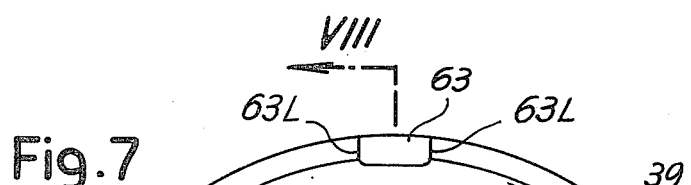

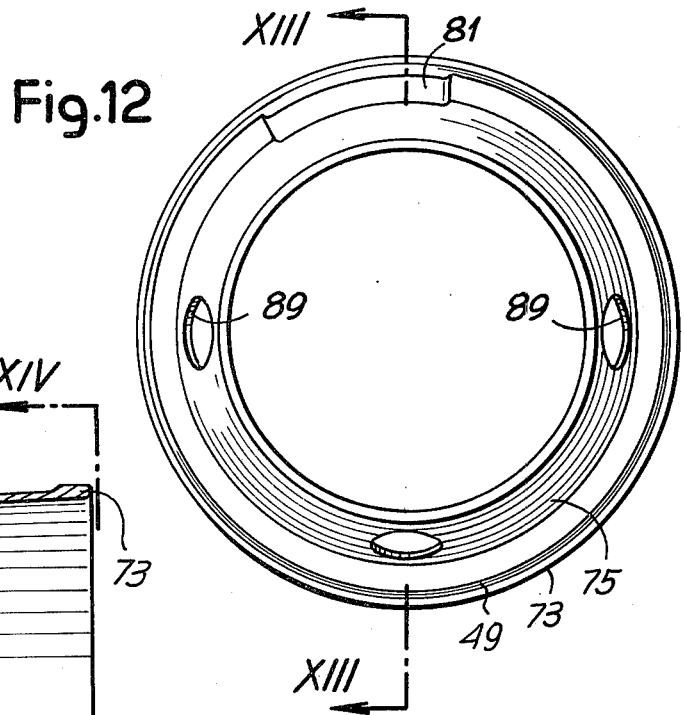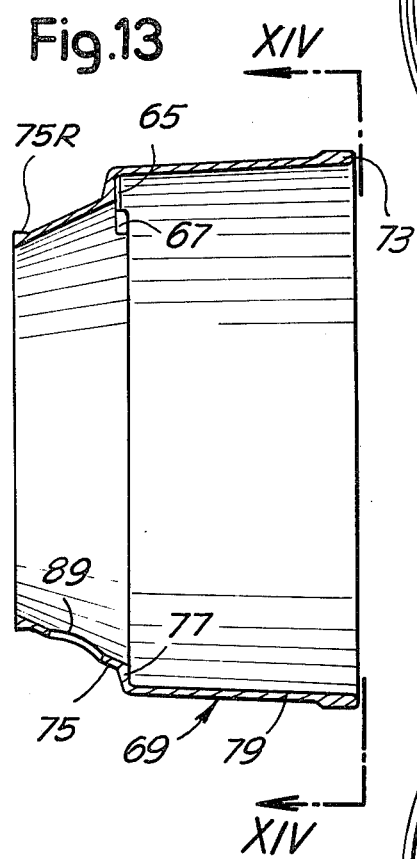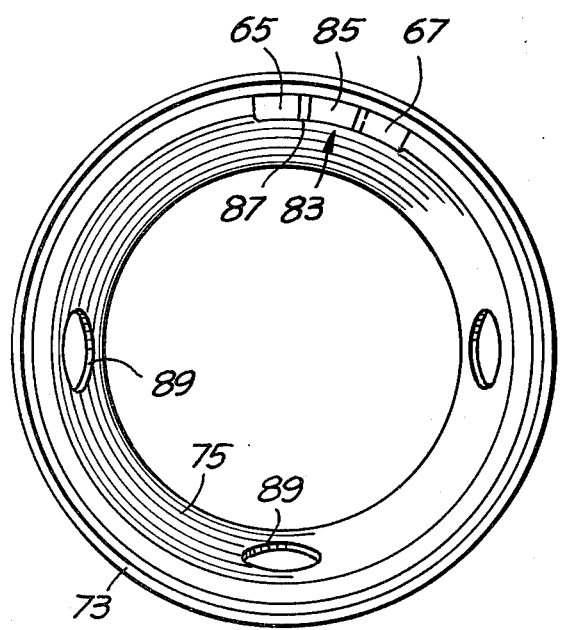

GUARD MADE UP OF SECTIONAL UNITS FOR CARDAN SHAFTS

FIELD AND BACKGROUND OF THE INVENTION

In case of some operating machines and particularly agricultural machinery which draw their motion from a power take off—for example farm tractors—by cardan shafts, it is very important that the latter are covered with suitable guards to prevent accidents. In fact, frequent labor accidents occur, especially due to the presence of rotating universal joints which can grasp a limb or a garment of the operator or other employed people.

SUMMARY OF THE INVENTION

It is the object of the present invention to provide a guard for cardan shafts which, in addition to giving the utmost safety, is characterized by a remarkable facility of assembling, dimensional adaptability, possibility to adjust the extensions of the telescopic drive according to the positions reached, and easy lubrication and/or overhauling operations.

The guard according to the invention is further effective to protect the transmission and in particular the articulations of the joints from dust or foreign matters.

These and other advantages of the guard according to the invention will be apparent to those skilled in the art from a reading of the following.

According to the invention, a guard for cardan shafts, especially of the telescopic type, designed for agricultural machinery and the like, comprises in combination: on the base of the universal joint a collar with annular throat for supporting the guard; an inner open ring nut with an internal annular projection for being housed in said annular throat; appendixes or projections forming seats for a tubular sheath of the telescopic guard part of the shaft, some of said appendixes have click detents for engagement into notches of said tubular sheath; and an inner main funnel, for being engaged on and covering said inner ring nut in order to prevent its divarication. Resilient tongues and seats are also provided for the spring-engagement of said inner main funnel on said inner ring nut; and an additional outer funnel-shaped band is spring-engaged on said main funnel to make up a prolongation thereof.

Also according to the invention, said additional band is advantageously engaged through a frustum annular band part—or equivalent—into an annular seat formed in said inner main funnel.

Advantageously, the invention further provides for said additional band and said inner main funnel to be angularly mobile between them. Cooperating shapes of the parts limit the relative angular excursion and elastically define two positions, in one of which the holes of the additional band and the holes of the inner main funnel are aligned to give access to the inside—especially for lubrication purposes—and in the other one of said positions said holes are offset to prevent access.

Further, the inner ring nut may be provided with inclined resilient tongues able to spring into seats formed inside said inner main funnel when the latter is axially mounted on the inner ring nut; and suitable holes may be provided in said seats acting on said resilient tongues to deform them in the releasing direction from said seats.

According to a further advantage of the invention, said inner main funnel and inner open ring nut present reference profiles in order to get a single mating angular position; and an oiler is provided on said ring nut, which corresponds to a notch in said ring nut.

The invention will be better understood upon a reading of the following description and with reference to the accompanying drawing which shows a practical non-limitative example of the invention.

BRIEF DESCRIPTION OF THE DRAWINGS

FIGS. 1, 1A, 1B show a side view and enlarged sectional details of a drive shaft with the guard in object;

FIG. 2 shows an elevation view of the inner open ring nut of said guard;

FIG. 3 shows a view in section on line III—III of FIG. 2;

FIG. 4 shows a view according to line IV—IV of FIG. 3 of a detail of said ring nut;

FIG. 5 shows a section on line V—V of FIG. 2;

FIG. 6 shows a side view of a tubular sheath of the guard;

FIG. 7 shows a view of the minor diameter part of the inner main funnel of the guard;

FIG. 12 shows a view from the minor diameter part of the additional band of the guard;

FIG. 13 shows a view in section on line XIII—XIII of FIG. 12; and

FIG. 14 shows a view according to line XIV—XIV of FIG. 13.

DESCRIPTION OF THE PREFERRED EMBODIMENT

Figure 8:
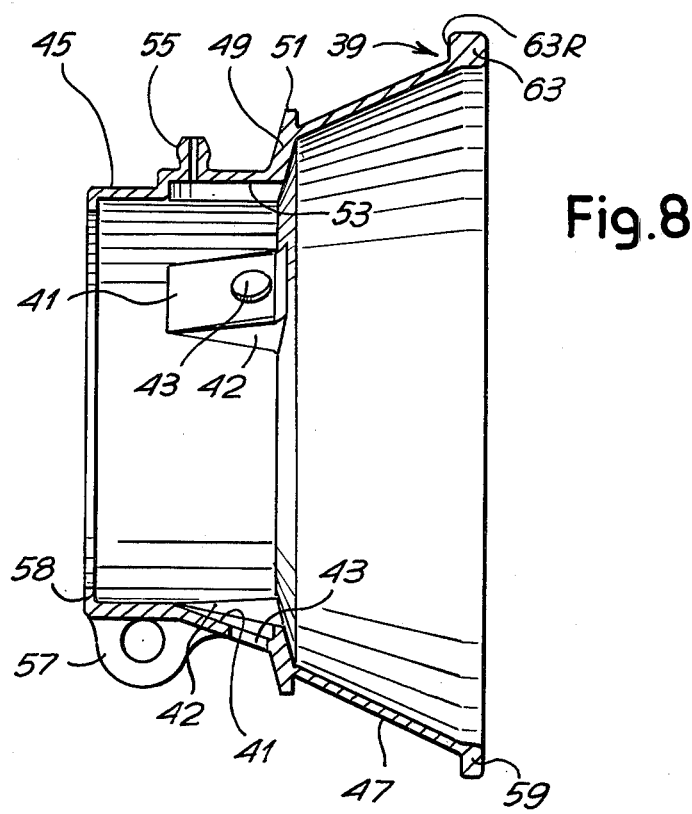
FIG. 8 shows a view in section on line VIII—VIII of FIG. 7.

In the drawing, at FIG. 1, numerals 1A and 1B; indicate the two parts of a telescopic drive shaft at the ends of which the forks 3 (FIGS. 1A and 1B), belonging to two universal joints, are fixed for connecting the shaft, for example, to a power take-off of a farm tractor on one side, and to an operating agricultural machine actuated by the tractor engine, on the other side. Reference numeral 5 indicates the guard according to the invention, which is also telescopic, and is provided—on both sides in correspondence of each universal joint—with an inner open ring nut 7, as well as two tubular sheaths 9 and 11 connected to the one and the other, respectively, of the two cap parts of the guard. The tubular sheath 11 may telescopically slide within the sheath 9, its external diameter being slightly smaller than the inner one of the sheath 9. Said tubular sheaths 9 and 11 present, at the outer end, slots 13 (three in number as shown in FIG. 6) into which the appendixes or projections 15 of the ring nut 7 spring for engagement. The appendixes 15 present a tooth 15A turned inwardly, and the inner surface 17 of the tooth 15A results suitably frustum shaped to facilitate the click engagement of the tooth 15A into the corresponding slot 13. Also the wall 16 of the tooth 15A is conical for a better gripping. The ring nut 7 is substantially made up of a ring 8, which however has a reduced section in correspondence of each appendix 15, and that is identical to the one corresponding to the thickness of said appendix 15. The ring 8 represents a front ledge 10 for bearing the tubular sheath 9.

Each part 1a and 1B of the telescopic cardan shaft presents—on the base of the corresponding universal joint 19—a collar 21 having an annular throat 23 provided for the guard engagement. A projection 25 of the inner ring nut 7 is provided for insertion into the annular throat 23 so as to rest thereon without preventing rotation, when said ring nut is mounted on the collar 21, which is possible due to the presence of the notch 18 permitting the divarication of said ring nut thanks to its flexibility. The inner hole 7A of the ring nut 7 is thus engaged on the farthest part of the collar 21 from the universal joint 19. The appendixes 15 and the slots 13 are equally spaced apart at 120°. The ring nut 7 presents, on the opposite side of the appendixes 15, resilient tongues 27 which are substantially flat and inclined with respect to the common axis of the ring nut 7 and tubular sheath 9. In the drawing, there are three tongues 27 which are angularly spaced with 120° between them and are offset by about 60° with respect to the appendixes 15. The tongues 25 are connected to the ring nut 7 so as to be able to bend, due to the presence of a rectilinear canal 29 at their base. Each tongue 27 also has a groin-shaped notch or nail 31 upon which to push in order to bend it towards the axis of the ring nut 7. The ring nut 7 further has—at the opposite side of each tongue 27—additional substantially cylindrical appendixes or projections 33, whose angular development is nearly equal to that of the tongues 27 base. The appendixes 33 are substantially similar to the appendixes 15, with which they constitute, as a whole, a cylindrical seat for the tubular sheath 9.

Said ring nut 7 presents outwardly—in the vicinity with one opening notch 18 and in correspondence of one of the projections 15 (as shown in FIGS. 2 and 4)—a projection 35 shaped like a semicylinder whose side surface extends by short lengths of its flat surface, presenting inwardly a cavity 37 (FIG. 4) for the passage of oil coming from an oiler 55 which is lined up with said cavity once the guard is assembled. The cavity 37 presents outwardly a short inclined surface 37I, while the surface inwardly delimiting it has a radial shape. The ring nut 7 is suitably made of rigid but elastic material.

Figure 10:
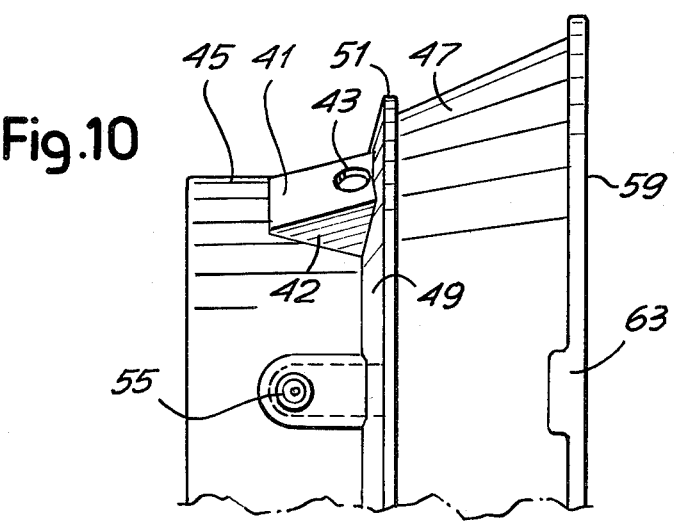
FIGS. 9, 10 and 11 show other views, FIG. 11 being a section on line XI—XI of FIG. 9, of a component of FIGS. 7 and 8.
Figure 9:
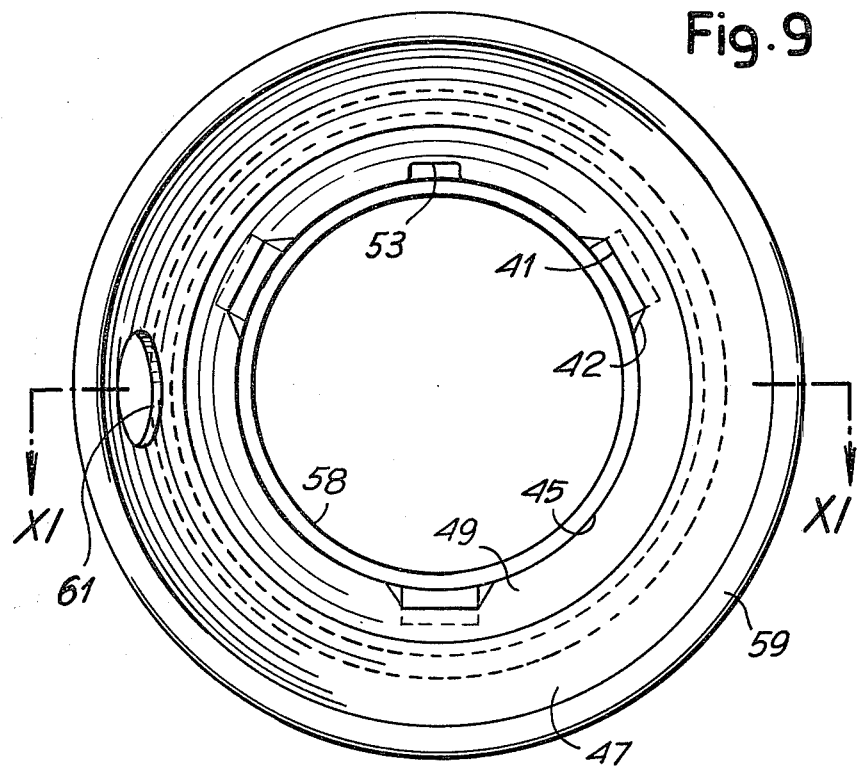
Figure 11:
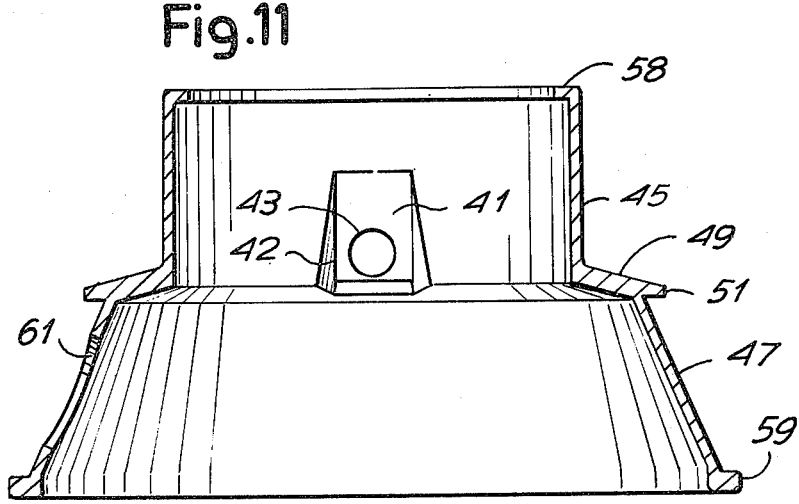

On the ring nut 7 an inner main funnel 39 is click-mounted (see FIGS. 7 to 11) which is made of semirigid and elastic material, and presents inclined seats 41—inwardly of projections 42—in order to click therein the tongues 27 of said ring nut 7, holes 43 being also provided in order to permit the outward disengagement of the tongues. The funnel 39 is made up of a nearly cylindrical zone 45 which is connected to a frustum-shaped zone 47 through a substantially frustum-shaped union 49 which extends, outside the minor base of zone 47 of said funnel, with a projection 51. The cylindrical zone 45 presents, in addition to said inclined seats 41 and at opposite side of one of them, a groove 53 into which the projection 35 of the ring nut 7 slides during the assembly. Outside the groove 53 an oiler 55 is fixed which, after the assembly has been completed, is aligned with the cavity 37 of the projection 35. The cylindrical zone 45 further includes a ring-shaped appendix 57 in correspondence of the middle part with one of the projections 42 and partially jointed thereto. The funnel 39 is delimited by an annular projection 58 at the end of the cylindrical part 45, which is turned inwardly and—upon the assembly—forms a ledge for the ends of appendixes 15 and 33 of the ring nut 7. The frustum zone 47 of the funnel 39 is delimited by the projection 51 and by a narrow flange edge 59, respectively; and it has also a circular hole 61 for inspection. The edge 59 presents—opposite to the ring appendix 57—a thickening 63 turned backwards towards the frustum zone 47, said thickening being provided for housing engaging seats 65 and 67 of an additional band 69 whose function is to make up a prolongation of the main funnel 39 and a protection for the universal joint. The side walls 63L of said thickening are suitably united with its wall 63R to permit a spring-shift of the thickening 63 from one seat to the other of the two seats 65 and 67.

In the guard according to the invention two additional bands (or caps) are provided, one for each of the two universal joints. They are denoted by 69 (on the left of FIG. 1) and by 71 (on the right in FIG. 1) respectively; the additional band 71 differs from the one indicated by 69 in that it has a supplementary, approximately cylindrical, prolongation 70 which is not present in the other one, and in that the stiffening edge 73 is located on the band 71 at the end of the supplementary prolongation 70 instead of the frustum zone 79. These additional bands may have different shapes and are interchangeable to meet different requirements.

Besides the difference just stated, the additional bands 69 and 71 are made up of a first frustum zone 75 united through an annular wall 77 to a zone 79 having a very slight taper, that is, very near to a cylindrical surface. The frustum zone 75 presents at its smaller diameter end, a projection 75R resulting from a short cylindrical surface length, while at the other end, it is delimited by the external surface of the annular wall 77. The frustum zone 79 of the additional band 69 presents, at the greater diameter end, the already mentioned stiffening edge 73. The annular wall 77 presents—in the upper part of the drawing—an external projection 81 inwardly corresponding to a shaped cavity 83 which forms said seats 65 and 67 being comparatively deep and separated by a less deep annular space 85, to which they are united through inclined surfaces 87. On the first frustum zone 75, circular holes 89 are formed, all having approximately equal diameter and at the same angular position as hole 61 of funnel 39, with which they can be made to line-up in use, for lubrication or inspection purposes.

It is easy now to understand the assembly and working of the guard according to the invention. As it deals with a telescopic cardan transmission, let us suppose it is disarranged in its two parts and let us consider the left-hand part of FIG. 1. For the assembly, the ring nut 7, suitably divaricated, is mounted on the collar 21 of the shaft 1, so that the projection 25 of the ring nut 7 comes to house itself in the throat 23 of said collar. Then, the sheath 9 is inserted from the end side of the shaft 1, opposite to the universal joint 19, with the slots 13 toward the ring nut 7. The end 9F of said sheath is introduced between the appendixes 15 and 33 of the ring nut 7 till it rests on the front ledge 10 of the ring 8 of said ring nut. The teeth 15A of the appendixes 15 are made to enter the slots 13 of the tubular sheath 9 locking it at its right position where it is kept owing also to the presence of the appendixes 33. Further, the main inner funnel 39 is inserted on the tubular sheath 9 with the result of keeping permanently closed the ring nut 7, while the projection 58 behind the funnel 39 forms a ledge against the ends of the appendixes 15 and 33. The assembling of the funnel 39 on the ring nut 7 is accomplished by presenting the ring nut in the only possible angular position in which the resilient tongues 27 of said ring nut spring into engagement inside the inclined seats 41, and the slot 53 overlaps the projection 35. Once the tongues 27 have outwardly released themselves into the seats 41, the funnel 39 results steadily fixed on the ring nut 7 without any possibility of coming out. The oiler 55 is lined-up with the cavity 37 inwardly with respect to the projection 35 of the ring nut 7, as can be seen from FIG. 1. In this position of funnel 39, the hole 61 results diametrically opposite to the oiler 55, while the thickening 63 is on the edge 59 of the funnel 39 and aligned with said oiler.

The additional band 69 is then inserted as far as it blocks itself on the funnel 39, since the frustum zone 75 springs into engagement on the frustum zone 47 of said funnel, between the projection 51 and the edge 59 against which the projection 75R and the inside of the annular wall 77, respectively, come to clash. Also the assembly of the additional band 69 must be accomplished—due to the presence of the thickening 63—in a mutual position, between band 69 and funnel 39, so that said thickening can be housed into one of the two seats 65 or 67. In the position shown in FIG. 1, the thickening 63 is housed in the seat 65, thereby the holes 61 and 89 result overlapped. However, the additional band 69 can be made to rotate with respect to the funnel 39, so that the thickening 63 may sets itself into the seat 67, getting over the projecting annular zone 85 thanks to the inclined walls 87. With the additional band 69 in this rotated position, the holes 89 result offset to the holes 61, which are thus covered by portions of the frustum zone 75 of said band.

After having assembled the carden drive by mounting the tubular part 1A of the shaft on the part 1 and by introducing the tubular sheath 11 inside the tubular sheath 9, the guard 5 results supported by the collars 21, into whose annular throats 23 the annular projections 25 of the ring nut 7 are housed. Through the oiler 55, via the cavity 37, it is possible to deliver oil to said coupling between the ring nut 7 and the collar 21. Therefore, while the guard 5 may be kept steady by constraining, for example, the ring appendixes 57 of the funnel 39 to fixed parts of the machine frame, the shaft 1 and the tubular part 1A, telescopically connected therewith, may freely rotate inside the guard without any appreciable friction in the described relative motion. The presence of the cooperating shapings made up of the thickening 63 on the funnel 39 and of the seats 65 and 67 inside the additional band 69 (and 71), allows said additional band to move angularly with respect to the funnel 39. However, the angular excursion is limited, and two positions result elastically defined, in one of which (thickening 63 being housed in seat 65) the holes 89 of the additional band correspond to the holes 61 of the inner funnel, for the access to inside; in the other position said holes result offset thereby preventing the access. The additional bands 69 and 71 make up an efficient protection for the universal joints of the transmission.

In case it is necessary to disassemble the guard, the funnel 39 may be disengaged and withdrawn from the ring nut 7 by pushing inwardly the resilient tongues 27 through the holes 43 of the seats 41, thus releasing them from said seats. Upon disassembling the funnel 39, the disassemble of the whole guard follows very easily.

It will be understood that the drawings show only an embodiment of the invention, which may vary in regard to form and disposition without coming out from the basic idea which characterizes the invention itself. The possible presence of reference numerals in the following claims has the purpose to facilitate the reading of the claims with reference to the description and drawing, and it does not limit the range of protection of the claims.

What is claimed is:

1. A guard for a cardan shaft having at least one universal joint with a base, and a shaft connected to the base, comprising:
    a collar (21) having an annular throat (23) and mounted on the base;
    an inner radially expandable open ring nut (7) having an inner annular projection (25) rotatably engaged in said annular throat (23), a plurality of resilient tongues (27) extending on one side of said ring nut, and a plurality of appendixes (15, 33) extending on an opposite side of said ring nut and forming a seat on the inner surface thereof;
    a telescopic guard part (9, 11) having a tubular sheath (9) for covering the shaft and engaging in said seat, said sheath having a plurality of slots (13);
    at least some of said appendixes (15) having click detents (15A) for engagement into said slots (15) of said tubular sheath;
    an inner main funnel (39) mounted on and covering said inner ring nut (7) holding said nut and preventing its radial expansion, said inner main funnel having a tongue seat (41) for each of said resilient tongues (27) for a spring-engagement of said inner main funnel (39) on said inner ring nut (7) and for preventing relative rotation between said nut and said inner main funnel; and
    an outer funnel-shaped band (69) spring-fitted on said main funnel to form an extension thereof in an axial direction of said guard and axially fixed with respect to said inner main funnel.

2. A guard according to claim 1, wherein said band includes a first frustum zone, said inner main funnel having a frustum shaped zone with projections on axial sides thereof for receiving said first frustum zone of said band and axially fixing said band with respect to said funnel.

3. A guard according to claim 2, wherein each of said band and said funnel have an opening which are aligned at one relative rotational position between said funnel and said band for access from an exterior of said guard to an interior thereof, said openings being misaligned to another relative rotational position of said band and said funnel; and elastic position holding means connected between said band and said funnel for
    resiliently retaining said band and said funnel in said one and other positions.

4. A guard according to claim 3, wherein said elastic position holding means comprises one of said annular projections of said funnel having a thick portion and said band defining a pair of seats with an elastic incline therebetween each for receiving said thickened portion in one of said relative rotational positions, and permitting relative rotation of said band and funnel to position said thickened portion in the other of said pair of seats.

5. A guard according to claim 4, wherein said ring nut includes a radially outwardly extending reference projection, said inner main funnel having an inner groove for receiving said reference projection and an oiler projection having an opening communicating with said groove for permitting entry of lubricant to said groove, said reference projection including a recess communicating with said inner annular projection for providing lubricant to said inner annular projection and said annular throat.

6. A guard according to claim 5, wherein said inner funnel includes a ring appendix extending outwardly therefrom in the vicinity of one of said tongue seats and on a portion of said funnel which is not covered by said band, for rotationally fixing said band so that the universal joint with said annular throat may rotate with respect to said ring nut, funnel and band.

7. A guard according to claim 1, wherein each of said resilient tongues is inclined outwardly with respect to said axial direction of said guard, each of said tongue seats having a circumferential extent substantially the same as each of said resilient tongues respectively for preventing relative rotation between said funnel and said nut, said funnel including a hole in each of said tongue seats for permitting access from an exterior of said funnel to dislodge each resilient tongue from each respective tongue seat.

8. A guard according to claim 7, wherein said ring nut includes a radially outwardly extending reference projection, said inner main funnel having an inner groove for receiving said reference projection and an oiler projection having an opening communicating with said groove for permitting entry of lubricant to said groove, said reference projection including a recess communicating with said inner annular projection for providing lubricant to said inner annular projection and said annular throat.

9. A guard according to claim 1, wherein said ring nut includes a radially outwardly extending reference projection, said inner main funnel having an inner groove for receiving said reference projection and an oiler projection having an opening communicating with said groove for permitting entry of lubricant to said groove, said reference projection including a recess communicating with said inner annular projection for providing lubricant to said inner annular projection and said annular throat.

* * * * *